(12) United States Patent
Muxlow et al.

(10) Patent No.: US 7,134,306 B2
(45) Date of Patent: Nov. 14, 2006

(54) LIGHTWEIGHT TOOL FOR CRIMPING A FLANGE COVER

(75) Inventors: Fred Muxlow, Barrie (CA); Steve Chandler, Toronto (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 11/030,628

(22) Filed: Jan. 5, 2005

(65) Prior Publication Data

US 2006/0144113 A1   Jul. 6, 2006

(51) Int. Cl.
*B21D 39/02* (2006.01)
(52) U.S. Cl. ..................... 72/211; 29/243.58
(58) Field of Classification Search .............. 72/210, 72/211, 245; 29/243.58; 81/301
See application file for complete search history.

(56) References Cited

U.S. PATENT DOCUMENTS

| | | | |
|---|---|---|---|
| 3,269,223 A | * | 8/1966 | Pawloski ..................... 81/487 |
| 4,996,756 A | | 3/1991 | Bright et al. ................. 72/211 |
| 5,864,933 A | * | 2/1999 | Sheline ..................... 29/243.58 |
| 5,875,670 A | | 3/1999 | Stojkovski et al. ........... 72/211 |

* cited by examiner

*Primary Examiner*—Lowell A. Larson
(74) *Attorney, Agent, or Firm*—Clark Hill PLC

(57) ABSTRACT

A crimping assembly roll crimps a cover part over an underlying structure. The crimping assembly includes a base. A first roller extends out from the base and is rotatable with respect thereto. A second roller extends out of the base and is rotatable with respect thereto. In addition, the second roller is movable axially with respect to the first roller. A transmission is operatively connected to the first roller and the second roller such that the first and second rollers roll at the same speed. The crimping assembly also includes a pneumatic motor connected to the transmission to selectively drive the transmission and roll the first and second rollers as the first and second rollers roll over the cover part to force the cover part into engagement with the underlying structure.

17 Claims, 3 Drawing Sheets

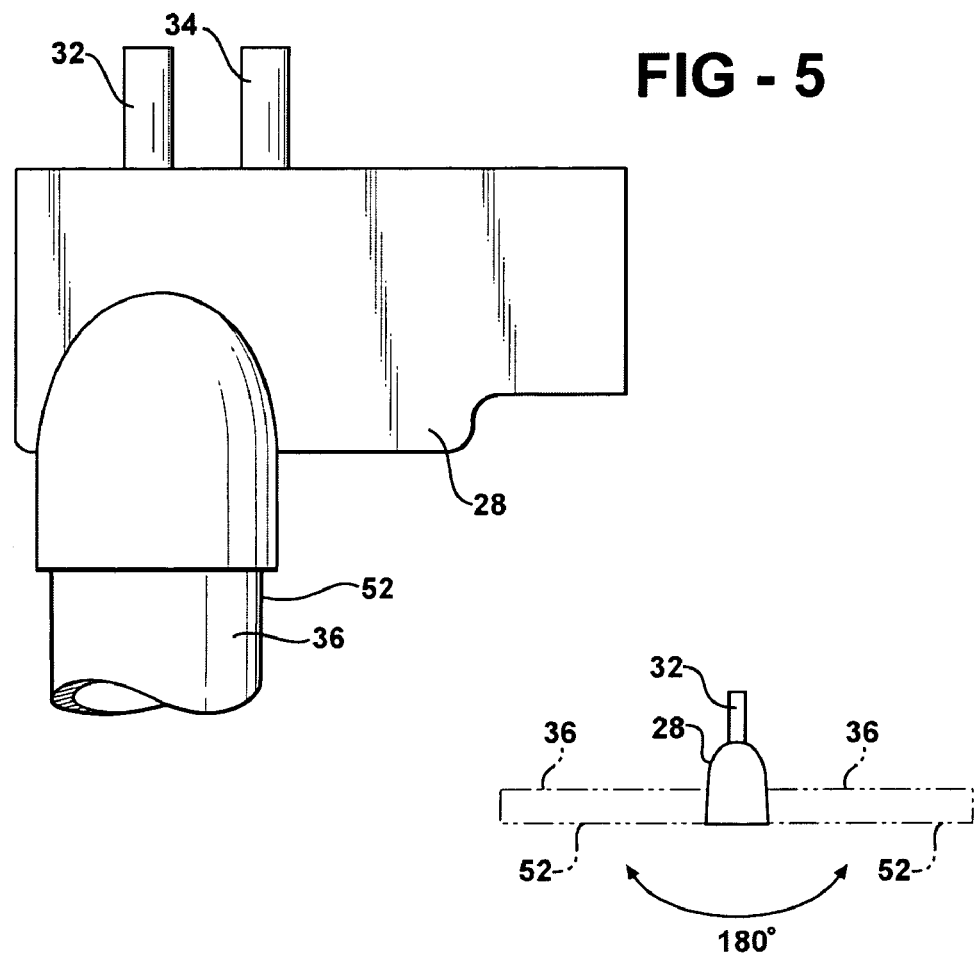
FIG - 5
FIG - 6
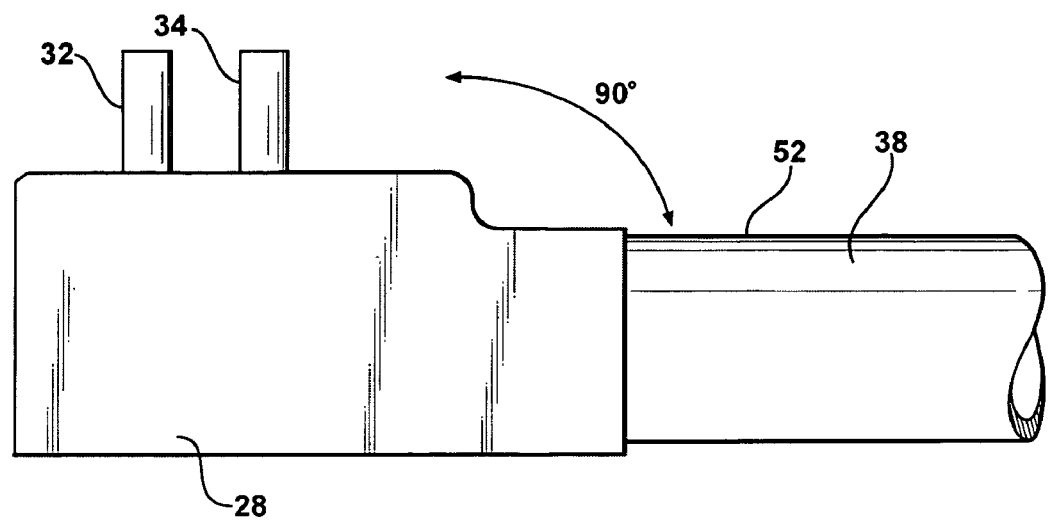
FIG - 7

US 7,134,306 B2

LIGHTWEIGHT TOOL FOR CRIMPING A FLANGE COVER

BACKGROUND ART

1. Field of the Invention

The invention relates to a tool for affixing one element to another. More specifically, the invention relates to a tool for crimping a flange cover over a flange of a motor vehicle.

2. Description of the Related Art

In the complex manufacturing of complex assemblies, it is often required to finish one part by covering it by another. With a motor vehicle, an example of an area where a part is formed over another part is in an opening providing access to a passenger compartment. In the construction of the motor vehicle, a flange extends out around the periphery of the access opening. That flange is covered with a flexible material allowing a door to abut up thereagainst and distort the flexible material slightly to create a seal between the door and the access opening. This is one example of many situations where a part is designed to cover another part.

One problem associated with the design of one part covering another part is the proper securing of the covering part over the underlying structure. Often times, the resulting cover part is crimped over the underlying structure. One example of a tool used to crimp a cover over an underlying structure, such as a flange, is disclosed in U.S. Pat. No. 5,875,670. In this disclosure, a drive means forces one roller into a second roller to crimp a cover over the flange. A biasing means forces the movable roller axially away from the other roller when no pressure from the drive means is being applied against the first roller. The biasing means is a spring which routinely fails over time. This results in a tool that must be consistently serviced. In addition, the spring reduces the effective pressure of the roller because it is always applying a force against the closing pressure. It is a non-removable bias applying constant pressure against the closing pressure.

SUMMARY OF THE INVENTION

A crimping assembly roll crimps a cover part over an underlying structure. The crimping assembly includes a base. A first roller extends out from the base and is rotatable with respect thereto. A second roller extends out of the base and is rotatable with respect thereto. In addition, the second roller is movable axially with respect to the first roller. A transmission is operatively connected to the first roller and the second roller such that the first and second rollers roll at the same speed. The crimping assembly also includes a pneumatic motor connected to the transmission to selectively drive the transmission and roll the first and second rollers as the first and second rollers roll over the cover part to force the cover part into engagement with the underlying structure.

BRIEF DESCRIPTION OF THE DRAWINGS

Advantages of the invention will be readily appreciated as the same becomes better understood by reference to the following detailed description when considered in connection with the accompanying drawings, wherein:

FIG. 5 is a side view of one embodiment of the invention;

FIG. 6 is an end view of the invention with a pneumatic motor shown in phantom in a plurality of positions; and FIG. 7 is a side view of a second embodiment of the invention.

DETAILED DESCRIPTION OF THE PREFERRED EMBODIMENT

Figure 1:
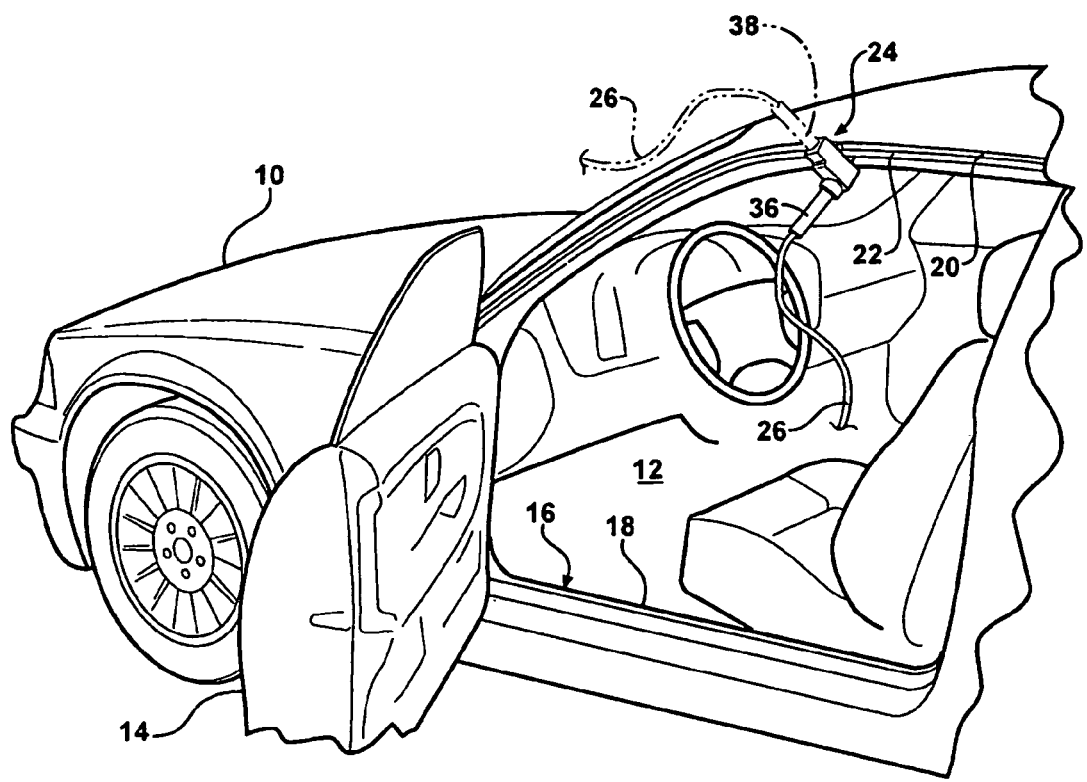
FIG. 1 is a perspective view of a motor vehicle, partially cut away, showing one embodiment of the invention working on the motor vehicle.

Referring to FIG. 1, a motor vehicle 10 is shown partially cut away. The motor vehicle 10 has a passenger compartment 12, a side door 14 and an access opening, generally shown at 16. The access opening 16 defines a periphery 18 which extends thereabout which is substantially identical to the outer periphery of the side door 14. An underlying structure 20 extends along at least a portion of the periphery 18 of the access opening 16. In the embodiment shown, the underlying structure 20 is a flange extending out from the motor vehicle 10 into the access opening 16 along the periphery thereof. It should be appreciated by those skilled in the art that the underlying structure 20 may be a structure other than a flange in an access opening 16.

A cover part 22 covers the underlying structure 20 along the entire length of the underlying structure 20. The cover part 22 is, in many times, a composite of two materials having varying resiliency. An internal component is typically a metal which, while flexible, is not resilient in that it does not spring back to its original form once it is bent. The cover part 20 typically includes an outer component which is resilient and springs back to its original form after a deforming force is removed therefrom. The resilient material is a rubber-like material that is used to seal the access opening 16 when the side door 14 abuts thereagainst. The metal component of the cover part 22 is molded inside the resilient component such that the cover part 22 appears to be a rubber piece with no metal component visible.

A crimping assembly is generally indicated at 24 in FIG. 1. The crimping assembly 24 crimps the cover part 22 over the underlying structure 20 securing the cover part 22 thereto. The cover part 22 has a U-shape and its two longer legs are crimped against the underlying structure on either side thereof. The crimping assembly 24 does this by applying a force inwardly against the cover part 22 on either side thereof after the cover part 22 is positioned over the underlying structure 20. The crimping assembly 24 squeezes the covet part 22. The crimping assembly 24 is a pneumatic tool and receives its power from an air supply through an air line 26. The use of air pressure through the air line 26 will be discussed in greater detail subsequently.

Figure 2:
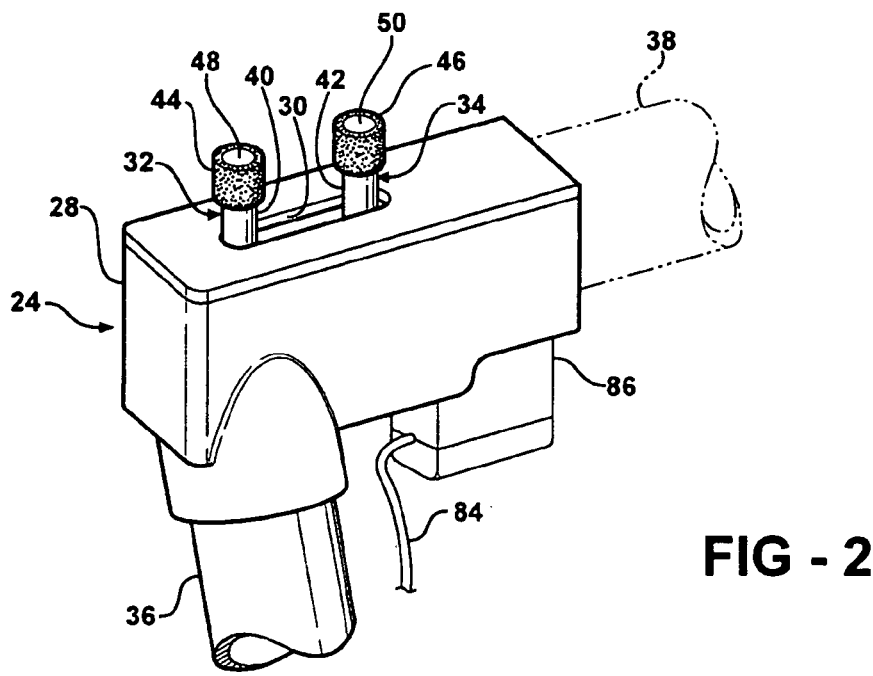
FIG. 2 is perspective view of the invention, partially cut away.

Referring to FIG. 2, the crimping assembly 24 is shown, partially cut away. The crimping assembly 24 includes a base 28. The base 28 is also a housing covering the inner workings of the crimping assembly 24. The base 28 includes a slot 30 that allows first 32 and second 34 rollers to extend out therefrom. The base 28 provides two optional positions for the pneumatic motor 52, i.e., in a horizontal or vertical position to cover the variety of different flange openings (FIG. 5). The pneumatic motor 52 at position 36 can be orientated to any position within 180° of the base 28. The pneumatic motor 52 at position 38, shown in phantom, remains at 90° to the rollers 32, 34. In every position, the pneumatic motor 52 acts as a handle for the crimping assembly 24.

The first 32 and second 34 rollers have first 40 and second 42 roller axles with first 44 and second 46 roller pads fixedly secured to the roller axles 40, 42 about distal end 48, 50 thereof.

Figure 3:
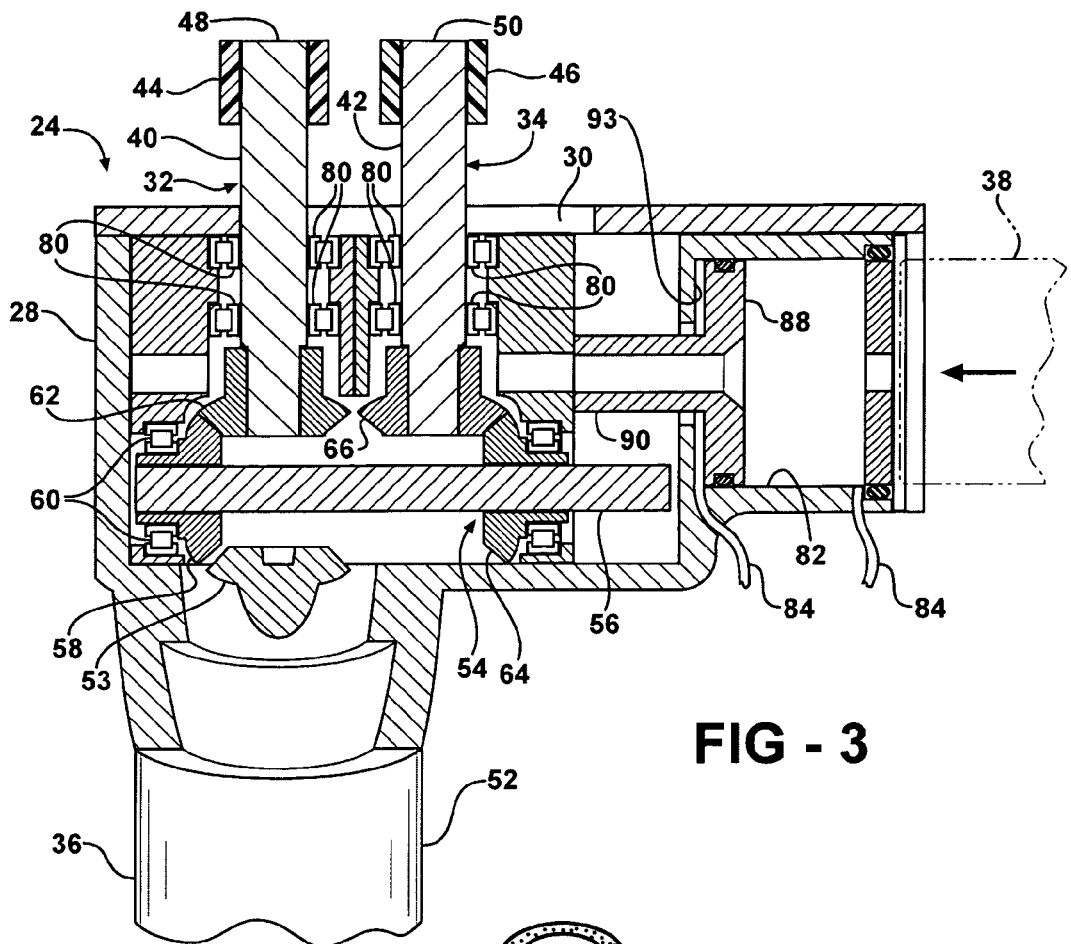
FIG. 3 is a cross-sectional side view of the invention in an engaged condition.

Referring to FIG. 3, the crimping assembly 24 is shown in cross section. The crimping assembly 24 includes a pneumatic motor 52, which is operatively connected to an output gear 53. The pneumatic motor 52 is housed within the handle 38 and in communication with the air line 26. Compressed air from an air source is fed through the air line 26 into the handle 38. The pneumatic motor 52 receives the air and transforms the compressed air into rotation of the output gear 53.

Figure 4:
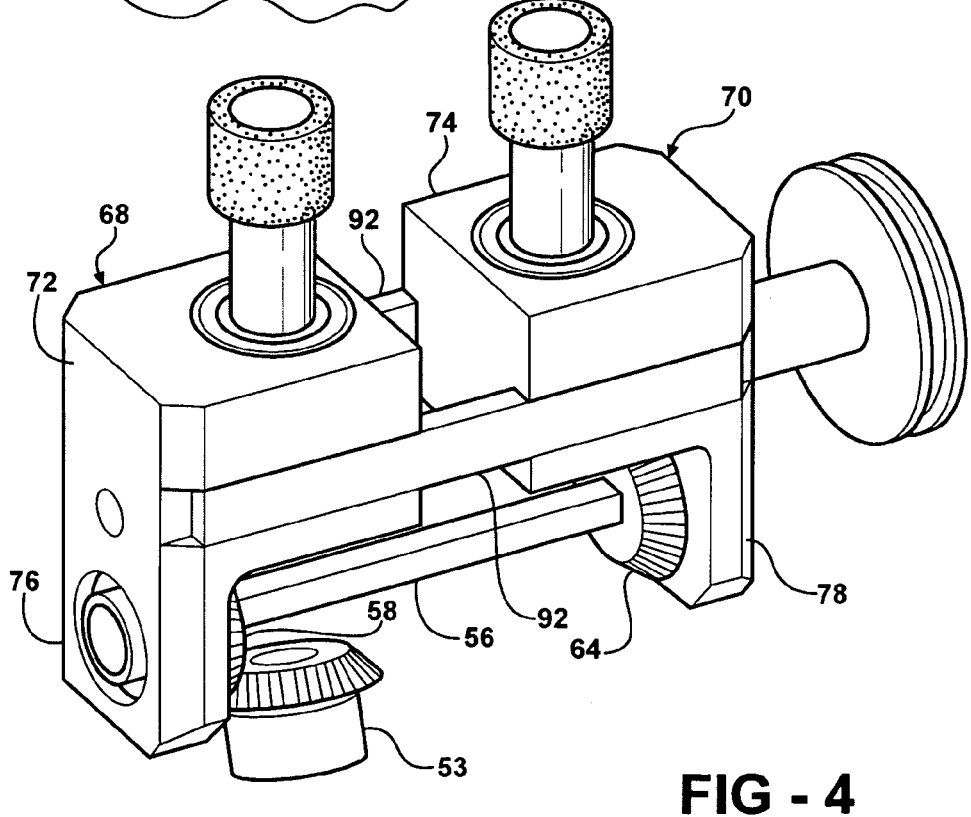
FIG. 4 is a perspective view of the invention with the cover removed showing the crimping assembly in its disengaged condition.

The rotation of the output gear 53 by the pneumatic motor 52 engages a transmission, generally indicated at 54. The transmission 54 includes a shaft 56 which extends along the base 28 perpendicular to the first 40 and second 42 roller axles. The shaft 56 has a cross section in the shape of a polygon (best shown in FIG. 4) and will be discussed in greater detail subsequently. The pneumatic motor 52 engages a fixed miter gear 58. The fixed miter gear 58 is referred to as a fixed miter gear 58 because it is fixed in position with respect to the base 28. The fixed miter gear 58 is secured in place using bearings 60. The fixed miter gear 58 engages a first roller miter gear 62. The fixed miter gear 58 rotates the first roller miter gear 62, which is keyed to the first roller access 40 at an end opposite the distal end 48 thereof. Miter gears are used to allow different orientations between the shaft 56 and the axles 40, 42 without losing the ability to rotate the roller axles 40, 42. As is shown in FIG. 6, the miter gears 58, 62 allow the pneumatic drive 52 to be positioned anywhere within 180° of the base 28.

The shaft 56 extends through the fixed miter gear 58. Because the shaft 56 has a polygon cross section, the rotation of the fixed miter gear 58 also rotates the shaft 56. The rotation of the shaft 56 rotates a movable miter gear 64. The movable miter gear 64 rotates a second roller miter gear 66 which is fixedly secured to an end of the second roller axle 42 opposite the distal end thereof. The movable miter gear 64 is movable because it is not fixedly secured with respect to the base 28 and is movable along the shaft 56. Again, because the shaft 56 has a cross-sectional shape of a polygon, the movable miter gear 64 can move axially along the shaft 56 without creating lost motion between the shaft 56 and movable miter gear 64. The first roller 32 and second roller 34 are housed, together with their fixed miter gear 58 and movable miter gear 64, respectively, inside roller housings 68, 70. Each roller housing 68, 70 has a main body 72, 74 and a gear leg 76, 78 extending down therefrom. It is the roller housing 68, 70 that maintains the fixed spatial relationship between the fixed miter gear 58 and the first roller 32 as well as the movable miter gear 64 with respect to the second roller 34. Both the first roller 32 and the second roller 34 include a plurality of bearings 80 which allow the first 32 and second 34 rollers to roll with respect to the roller housing 68, 70.

The crimping assembly 24 also includes a second roller pneumatic chamber 82 which is in fluid communication with the pneumatic motor 52. An air line 84 is in fluid communication with the pneumatic motor 52 and supplies air under pressure to the second roller pneumatic chamber 82. A valve 86 directs the flow of air through the air line 84 into the second roller pneumatic chamber 82. When pressure builds up in the second roller pneumatic chamber 82, a diaphragm 88 is forced in a direction toward the second roller 34. A diaphragm shaft 90 forces the roller housing 70 toward the first roller housing 68. This, in turn, forces the second roller 34 toward the first roller 32 which will crimp the cover part 22 over the underlying structure 20.

A slide 92 extends between the roller housings 68, 70 and acts as a guide for the roller housing 70 associated with the second roller 34 to move with respect to the roller housing 68 associated with the first roller 32. In the preferred embodiment, there is a slide 92 on either side of the roller housing 68, 70. Movement of the roller housing 70 forces the movable miter gear 64 to move along the shaft 56. The movable miter gear 64 can move axially along the shaft 56 while still rotating due to rotation of the shaft 56 as it is powered by the pneumatic motor 52.

When the crimping assembly 24 is to be released, the valve 86 is switched such that the air pressure in the second roller pneumatic chamber 82 is relieved by exhausting the air out therefrom. In addition, the valve 86 forces air into a relief chamber 93. When pressure builds up in the relief chamber 93, the diaphragm 88 is forced in a direction away from the first roller 32. This moves the second roller 34 away from the first roller 32. The air pressure being injected into the relief chamber 93 obviates any need for a spring force to force the two rollers 32, 34 apart.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A crimping assembly for roll crimping a cover part over an underlying structure, said crimping assembly comprising:
    a base;
    a first roller extending out of said base and rotatable with respect thereto;
    a second roller extending out of said base and rotatable with respect thereto, said second roller movable toward and away from said first roller;
    a transmission operatively connecting said first roller to said second roller such that first and second rollers roll at the same speed;
    a pneumatic motor connected to said transmission to selectively drive said transmission and roll said first and second rollers as said first and second rollers roll over the cover part to force the cover part into engagement with the underlying structure;
    a second roller pneumatic chamber in fluid communication with said pneumatic motor, said second roller pneumatic receiving forced air therein to move said second roller inwardly toward said first roller to crimp the cover part into the underlying structure; and
    a relief chamber for forcing said second roller away from said first roller to relieve the force applied against the cover part.

2. A crimping assembly as set forth in claim 1 including a valve for switching air flow between said second roller pneumatic chamber and said relief chamber.

3. A crimping assembly as set forth in claim 2 wherein said first roller includes a first axle connected to said transmission.

4. A crimping assembly as set forth in claim 3 wherein said second roller includes a second axle connected to said transmission.

5. A crimping assembly as set forth in claim 4 wherein said second axle is parallel to said first axle.

6. A crimping assembly as set forth in claim 5 wherein said transmission includes a guide disposed perpendicular to said second axle.

7. A crimping assembly as set forth in claim 6 wherein said second roller includes a frame positioning said second roller with respect to said base.

8. A crimping assembly as set forth in claim 7 wherein said frame includes a channel for receiving said guide therein and allowing said second roller to move along said guide.

9. A crimping assembly as set forth in claim 8 including a diaphragm fixedly secured to said frame and disposed within said second roller pneumatic chamber.

10. A crimping assembly as set forth in claim 9 including a pneumatic motor extending out of said base.

11. A crimping assembly as set forth in claim 10 wherein said pneumatic motor extends out from said base at a vertical or horizontal angle thereto.

12. A crimping assembly for roll crimping a cover part over an underlying structure, said crimping assembly comprising:
 a base;
 a first roller extending out of said base and rotatable with respect thereto;
 a second roller extending out of said base and rotatable with respect thereto, said second roller movable toward and away from said first roller;
 a transmission operatively connecting said first roller to said second roller such that said first and second rollers roll at the same speed, said transmission including a set of miter gears operable in a plurality of orientation; and
 a pneumatic motor connected to said transmission to selectively drive said transmission and roll said first and second rollers as said first and second rollers roll over the cover part to force the cover part into engagement with the underlying structure.

13. A crimping assembly as set forth in claim 12 including a relief chamber for forcing said second roller away from said first roller to relieve the force applied against the cover part.

14. A crimping assembly as set forth in claim 13 including a second roller pneumatic chamber for receiving forced air therein to move said second roller inwardly toward said first roller to crimp the cover part into the underlying structure.

15. A crimping assembly as set forth in claim 14 including a valve for switching air flow between said second roller pneumatic chamber and said relief chamber.

16. A crimping assembly as set forth in claim 15 including a pneumatic motor extending out of said base.

17. A crimping assembly as set forth in claim 16 wherein said pneumatic motor extends out from said base at a vertical or horizontal angle thereto.

\* \* \* \* \*